Jan. 24, 1967  R. F. BRIGANTE  3,299,512
DENTAL TEACHING DEVICE
Filed Oct. 23, 1964  2 Sheets-Sheet 1

INVENTOR.
ROBERT F. BRIGANTE
BY
Boyken, Mohler & Footer
ATTORNEYS

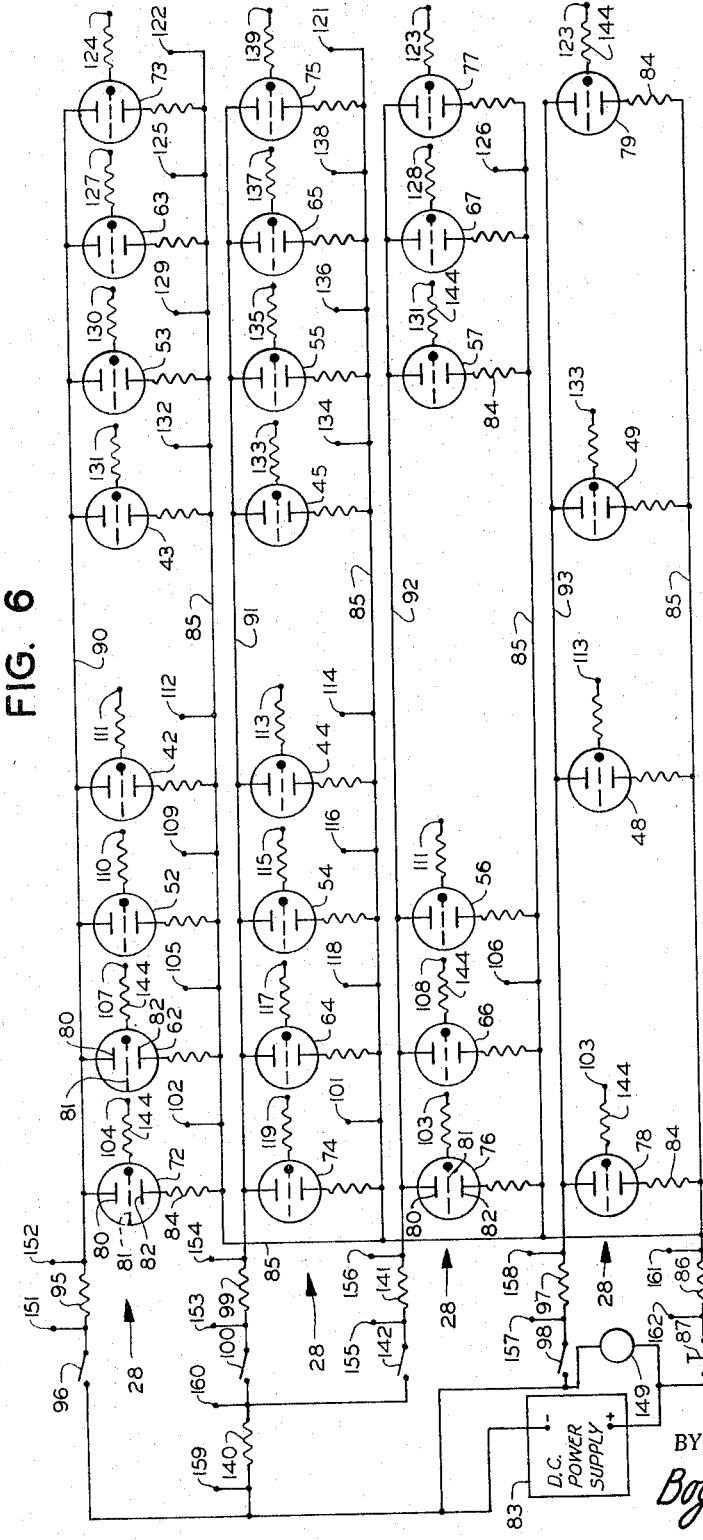
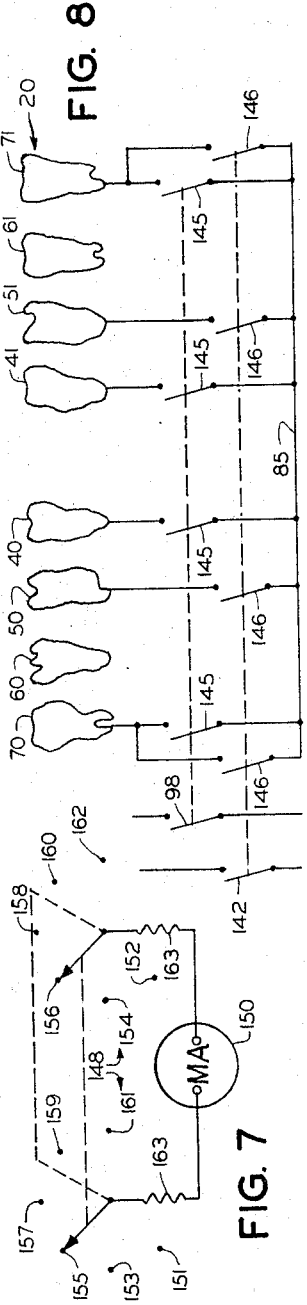

United States Patent Office 3,299,512
Patented Jan. 24, 1967

3,299,512
DENTAL TEACHING DEVICE
Robert F. Brigante, 2999 Regent St.,
Berkeley, Calif. 94705
Filed Oct. 23, 1964, Ser. No. 406,059
6 Claims. (Cl. 32—71)

This invention relates to dental teaching devices, and more particularly, to devices for teaching dental occlusion.

Dental occlusion refers to the relationship that exists between the masticating surfaces of the upper and lower teeth as said teeth normally contact each other.

Dental students usually study occlusion through practice in setting individual teeth in an articulator, a device that simulates the upper and lower jaws, or dental arches. The arches are in opposed relation and the articulator provides means for relative movement of the arches, simulative of human jaw movement. In practice, one dental arch will have a full complement of tooth models mounted therein, simulating an intact human jaw. The tooth models in the other dental arch will be mounted in adjustable mounting means. The student will seek to obtain preferred occlusion between the model teeth of the upper and lower dental arches by properly setting the adjustably mounted teeth.

The beginning student must use trial and error in setting the model teeth (hereinafter referred to as teeth for brevity). Because of his inexperience, he is unable to judge for himself whether or not he has attained correct occlusion. Instead, he must consult with his instructor after each trial to ascertain his progress, if any. Naturally the instructor is kept very busy and a student frequently must wait for a considerable length of time after having made a trial setting before he can obtain his instructor's attention and advice.

This invention provides a means that enables the student to ascertain immediately after his trial setting whether he has obtained preferred occlusion in the various predetermined bite relationships of the jaws and, if not, in what respect the occlusion is deficient. Thus, the student is able to check his own progress, and will need to consult his instructor only occasionally for more general advice. The instructor will be relieved of the mechanics of checking each student's trial settings and will have more time for teaching.

Accordingly, an object of this invention is to provide means associated with an articulator whereby a dental student may ascertain for himself whether or not he has attained preferred occlusion for various bite positions after orienting certain teeth in said articulator.

Another object of this invention is to provide means for indicating the degree of preferred occlusion for various bite relationships that a student has obtained between teeth set in dental arches.

An additional object of this invention is to provide means for ascertaining occlusion in cooperation with an indicating means that continues to indicate those teeth with which correct occlusion has been obtained after the articulator has been opened, to serve as a guide to the student while he is making his next trial setting.

Other objects and advantages of this invention will become apparent from the following description of one embodiment thereof taken in connection with the accompanying drawings, in which:

FIG. 6 is an electrical schematic showing a substantial portion of the circuitry of the indicating unit and the connections thereto.

FIG. 7 is an electrical schematic of the meter circuit of the indicating unit.

FIG. 8 is an electrical schematic of the connections between the electrical conducting teeth and the indicating unit.

Figure 1:
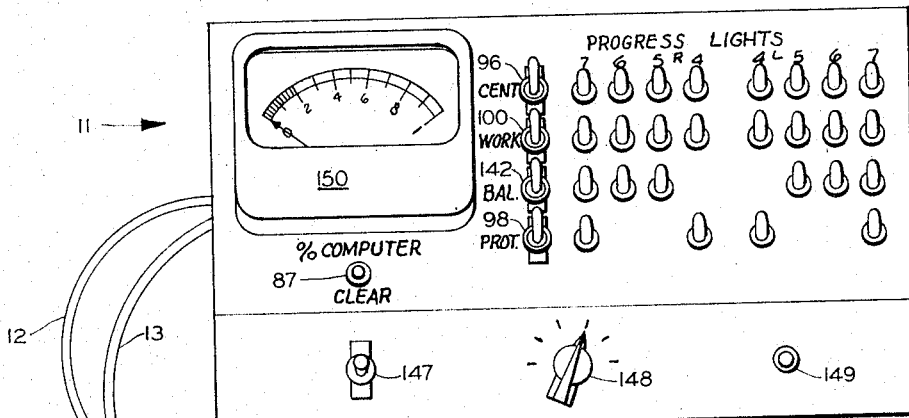
FIG. 1 is a composite view of a preferred embodiment of this invention including a perspective view of the articulator and a front elevational view of the indicating unit.

In general, this invention comprises a dental articulator 10 and an indicating unit 11 connected therewith (FIG. 1). While, in the embodiment described herein, articulator 10 and indicating unit 11 are connected by electrical cables 12, 13, other means, such as telemetry, exist for effecting such connection and are within the contemplation of this invention.

Articulator 10 is a conventional articulator which simulates human jaw movement with one jaw laterally adjustable to the following preset bite relationships: centric bite, protrusive bite, and balancing and working bite (hereinafter described in detail). Articulator 10 includes upper and lower dental arches 14, 15, respectively, simulative of human gums or jaws. Each dental arch carries a plurality of model teeth, simulative of human teeth, arranged as in a patient's mouth. Dental arch 14 is shown in plan view in FIG. 2 with certain lower teeth superimposed thereover in dotted lines in centric bite position.

The student, in using this invention, orients or sets the teeth in one dental arch of the articulator. The teeth in the other dental arch are fixed in position. The teeth in either the upper or lower dental arch are made of an electrical conducting material. The teeth in the other dental arch are fabricated of an electrical insulating material and have electrical contacts placed on their masticating surfaces at locations which will touch said conducting teeth, if correct occlusion is obtained.

The contacts and the conducting teeth are separately connected to an indicating means. One arch or jaw of the articulator is adjusted for opposed movement into and out of the desired bite relationship. If, after the articulator is closed, correct occlusion for that bite relation is attained, the contacts will touch the conducting teeth, and electrical circuits will be completed causing indicating means to indicate the existence of proper occlusion.

Figure 2:
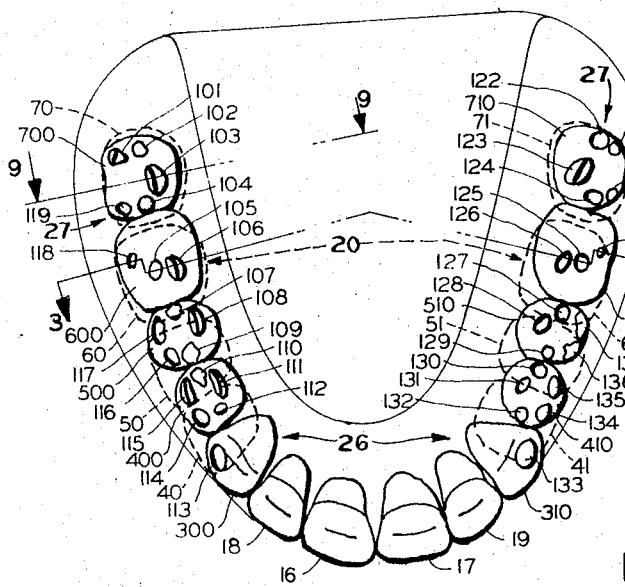
FIG. 2 is a plan view of the upper jaw of the articulator of FIG. 1 with certain lower teeth indicated therein in dotted lines in a centric bite position.

Reference numbering of most of the teeth shown in FIG. 2 and certain portions of indicating unit 11 that are associated with such teeth is based on the conventional Palmer notation. In such reference numbers, the first digit on the left is the Palmer number. In Palmer notation, the teeth are numbered in increasing order, starting at and moving away from the centermost teeth in the jaw. For example, upper centermost incisors 16, 17 (FIG. 2) are upper left 1 and upper right 1, respectively, in Palmer notation. The upper outermost incisors 18, 19 are upper left 2 and upper right 2, respectively, in Palmer notation. The Palmer number for each of the remaining upper teeth is given in Table I. Similarly, the first digit of the reference numbers of the lower bicuspids and molars (shown in dotted line in FIG. 2) is the Palmer number for each of said teeth. The second digit (counting from the left) of the reference numbers for the above identified teeth indicates the side of the jaw in which the tooth is located, 0 indicating the left side and 1 indicating the right side. Upper tooth reference numbers have an additional digit (a zero) to distinguish them from lower tooth reference numbers. The tooth reference numbers based on Palmer notation are tabulated in Table 1.

TABLE I.—REFERENCE NUMBERS FOR TEETH

| Tooth | Palmer Number | Lower Left Side | Lower Right Side | Upper Left Side | Upper Right Side |
|---|---|---|---|---|---|
| Canine | 3 | (¹) | (¹) | 300 | 310 |
| First Bicuspid | 4 | 40 | 41 | 400 | 410 |
| Second Bicuspid | 5 | 50 | 51 | 500 | 510 |
| First Molar | 6 | 60 | 61 | 600 | 610 |
| Second Molar | 7 | 70 | 71 | 700 | 710 |

¹ Not shown.

In the embodiment disclosed herein, the upper teeth and the lower incisors and canines are made of plastic, porcelain or some other non-conductor of electricity. Lower bicuspids 40, 41, 50, 51 and molars 60, 61, 70, 71, hereinafter generally designated as lower conducting teeth 20, are made of a metal such as silver, having good electrical conductivity.

FIGS. 3, 4, 5 and 9 show lower teeth 60, 61, 70 in cross section, mounted in dental arch 15. Said lower teeth are set in wax or other plastic material 22 for holding them firmly in place. However, a student may reorient their positions after heating the wax sufficiently to soften it. Wires 23 (FIG. 9) are connected individually to conducting lower teeth 40, 41, 50, 51, 70, and 71, as by soldering, at one end, and at their other ends to individual plugs 24 (FIG. 2). Plugs 24 fit into jacks (not shown) mounted in baseplate 25 of articulator 10 and are connected electrically with a multi-wire cable 13. Thus conducting lower teeth 20 may be conveniently removed individually or in groups from lower jaw 15 for cleaning or any other purpose and be as conveniently reconnected with cable 13 after being replaced in said jaw.

Upper teeth 300, 310, 400, 410, 500, 510, 600, 610, 700, 710, hereinafter generally designated as a group as upper teeth 26, are formed of electrically non-conducting material, such as plastic or porcelain. Holes drilled through teeth 26 at significant locations, such as tips of cusps, marginal ridges, central fossae, lingual cusps and buccal cusps have conducting or metallic contacts, such as gold, mounted therein. The locations selected for said contacts are points that touch lower teeth 20 during preferred occlusion in the various bite relationships when articulator 10 is closed. Said contacts are generally designated as upper tooth contacts 27. Wires attached individually to said contacts electrically connect them with indicator unit 11 through cable 12 by means similar to the connection of lower teeth 20.

When articulator 10 is closed, certain of contacts 27 touch lower teeth 20 and thus complete certain electrical circuits in indicating unit 11 if proper occlusion exists. Generally, different contacts touch lower teeth 20 during correct occlusion in the different bite relations that exist between arches or jaws 14, 15. By registering the completion of electrical circuits through contacts 27 and conducting lower teeth 20, indicating unit 11 indicates the number of such circuits completed and thus the extent to which preferred occlusion has been attained for the particular bite relation of the jaw that is being checked.

If the student has set the electrically conducting teeth in their proper orientation in the lower dental arch, then the indicating unit will show perfect occlusion when the articulator is closed for each of the different bite relations.

Figure 3:
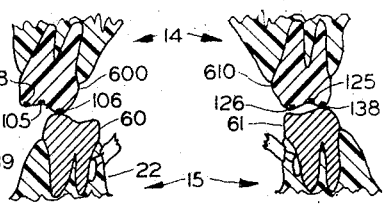
FIG. 3 is a cross-sectional view of the left and right sides of the upper and lower jaws of the articulator taken generally along lines 3—3 of FIG. 2, in which the left teeth are shown in balancing bite relation and the right teeth are shown in working bite relation.

Centric bite or centric occlusion occurs when all teeth of both jaws meet in a normal manner and forces exerted by the lower on the upper jaw are perfectly distributed in the dental arches. This is the position, shown in FIGS. 2 and 4, normally assumed when the lower jaw is not engaged in chewing, speaking, etc. Eccentric occlusion occurs when the jaws are closed in any of the excursive movements of the lower arch or jaw from centric bite. The protrusive bite relationship, the balanced bite relationship and the working bite relationship are eccentric occlusions that occur during the chewing cycle. Protrusive bite occurs when the lower incisors are thrust forward so that the lower incisors are no longer behind the upper incisors as in centric bite, but are directly below the upper incisors. The working bite relation and the balancing bite relation are similar to centric occlusion in that the lower incisors are behind the upper incisors, but different from centric bite in that the lower jaw is displaced slightly to the right or slightly to the left of centric bite. FIG. 3 shows the left tooth in balancing bite relation and the right tooth in working bite relation. Cross-mouth occlusion denotes one side of the jaw in balancing bite relation and the other side of the jaw in working bite relation.

In the preferred form of this invention, indicating unit 11 performs three particular functions: indication of completion of individual contact circuits (thus indicating proper occlusion for particular teeth when the articulator is in a preset bite relation of the jaw), retention and display of such information after articulator 10 and the individual contact circuits have been opened, and summation of the number of completed circuits in various groups of circuits to indicate the degree of occlusion attained for a particular bite relation (i.e., centric, balanced, working or protrusive) on a percentage or proportional basis.

Many different types of electrical circuits are presently known that can perform the functions enumerated above. This specification will describe in detail one electrical circuit for performing the above enumerated indicating functions, but such detailed description should not be interpreted to exclude other well-known indicating circuitry capable of performing said functions nor other means for connection or communication between the circuits of articulator 10 and indicating unit 11 from the scope of the claims appended hereto.

In the embodiment of indicating means 11 described herein, neon thyratrons 28 (also known as the three element hot-cathode tubes) are used as the elements for indicating completion of individual contact circuits. Thyratrons 28 each have three elements (identified in tube 72, upper left corner of FIG. 6), including a cathode 80, a grid 81 and a plate 82, and are filled with an inert gas, usually neon. A direct current power supply 83 is connected through intermediate circuitry (to be described in greater detail hereinafter) across cathode 80 and plate 82. Grid 81 is connected to power supply 83 through one or more of the individual electrical circuits of articulator 10. The voltage of power supply 83 is selected to be sufficient to initiate a glow discharge when applied between cathode 80 and grid 81, and also sufficient to maintain a glow discharge between cathode 80 and plate 83, but not sufficient to initiate a glow discharge when applied between cathode 80 and plate 82. In the instant embodiment, positive-control thyratron tubes are used. This type of thyratron requires the grid to be made positive with respect to the cathode for conduction to begin (i.e., for initiation of a glow discharge).

Wires connect the positive voltage terminal of supply 83 and grid 81 with the circuit in articulator 10 that will be closed when proper occlusion exists between the lower tooth 20 and its corresponding upper tooth or teeth. The occurrence of proper occlusion joins grid 81 to power supply 83 and a glow discharge initiates between said grid and cathode 80. The glow discharge causes the tube to glow, thus indicating the existence of preferred occlusion between the lower tooth and its corresponding upper tooth or teeth in a particular bite relationship. Further, once a glow discharge is initiated between grid 81 and cathode 80, it will spread to plate 82. Thus, such glow is maintained even after articulator 10 is opened (which breaks the circuit between grid 81 and supply 83) because cathode 80 and plate 82 are still connected across power supply 83. The glow can be extinguished only by disconnecting plate 82 or cathode 80 from power supply 83.

Indicating unit 11 has one thyratron for each conducting lower tooth 20 to indicate proper occlusion during centric bite, one thyratron for each conducting lower tooth 20 to indicate proper occlusion during working bite, one thyratron for each of lower teeth 50, 51, 60, 61, 70, 71 to indicate proper occlusion during balancing bite, and one thyratron for each of lower teeth 40, 41, 70, 71 to indicate proper occlusion during protrusive bite. Individual reference numbers for thyratrons 28 are listed in Table II.

TABLE II.—INDIVIDUAL REFERENCE NUMBERS FOR THYRATRONS BITE RELATIONSHIP

| Tooth | Centric | Working | Balancing | Protrusive |
|---|---|---|---|---|
| 40 | 42 | 44 |  | 48 |
| 41 | 43 | 45 |  | 49 |
| 50 | 52 | 54 | 56 |  |
| 51 | 53 | 55 | 57 |  |
| 60 | 62 | 64 | 66 |  |
| 61 | 63 | 65 | 67 |  |
| 70 | 72 | 74 | 76 | 78 |
| 71 | 73 | 75 | 77 | 79 |

As can be seen from Table II, the digit on the left of an individual thyratron reference number is the Palmer number. The digit on the right is odd or even, depending on the side of the jaw in which the tooth is located, and its value denotes the particular bite relationship. Referring to the digits on the right, digits 2 and 3 are associated with centric bite, 4 and 5 with working bite, 6 and 7 with balancing bite and 8 and 9 with protrusive bite. Thus, thyratron reference number 66 denotes that the thyratron is associated with the lower left side of the first molar in the balancing bite relationship.

The plates of tubes 28 are connected through individual plate current limiting resistors 84 to a common lead 85 (see FIG. 2). Common lead 85 is connected to the positive terminal of power supply 83 through a total current measuring resistor 86 and a normally closed pushbutton switch 87.

The groups of tubes 28 that are associated with particular bit relationships of the jaws each have common cathode leads. Thus, common cathode lead 90 is connected to the cathodes of the tubes 28 that indicate centric occlusion, viz: tubes 42, 43, 52, 53, 62, 63, 72, 73. Similarly, common cathode lead 91 is connected to the cathodes of the tubes 28 that indicate working occlusion (see Table II for individual tube reference numbers), common cathode lead 92 to the cathodes of tubes 28 indicating balancing occlusion and common cathode lead 93 to the cathodes of tubes 28 indicating protrusive occlusion.

Common cathode lead 90 is connected through centric bite measuring resistor 95 and SPST switch 96 to the negative terminal of power supply 83. Similarly, common cathode lead 93 is connected through protrusive bite measuring resistor 97 and SPST switch 98 to the negative terminal of power supply 83. Common cathode lead 91 is connected through working bite measuring resistor 99 and SPST switch 100 to one terminal of cross-mouth measuring resistor 140. Similarly, common cathode lead 92 is connected through balancing bite measuring resistor 141 and SPST switch 142 to said one terminal of measuring resistor 140. The other terminal of measuring resistor 140 is connected to the negative terminal of power supply 83.

The selection of specific locations for contacts 27 in upper jaw 14 depends upon the points of contact that exist between upper teeth 26 and lower teeth 20 during preferred occlusion when articulator 10 is positioned to simulate one of the standard bite relations of the jaws. If a lower tooth 20 has at least two convenient points of contact with an upper tooth 26 during proper occlusion in a particular bite relationship of the jaw, a circuit to indicate such an occlusion can be completed through the particular lower electrical conducting tooth 20 and the two contacts 27 positioned in the upper tooth 26 at said points of contact. In such a case, one of said two contacts is connected to common plate lead 85, and the other contact is connected through a grid current limiting resistor 144 to the grid of the thyratron tube 28 that is to indicate proper occlusion of the particular lower tooth 20 in the particular bite relation of the jaw in question. However, if a particular lower tooth 20 has only one convenient or possible point of contact with upper teeth 26 during proper occlusion in a particular bite relation of the jaw, a circuit to indicate such proper occlusion must be completed through one contact 27 and the particular conducting lower tooth 20. In such a case, said one contact is connected through a grid current limiting resistor 144 to the grid of the thyratron tube 28 that is to indicate proper occlusion of the particular lower tooth 20 in the particular bite relation of the jaw in question. The foresaid particular lower conducting tooth 20 will be connected to common plate lead 85.

It has been found desirable to establish two points of contact between each lower tooth 20 and upper teeth 26 for the centric and working bite relations and one point of contact in the balancing or protrusive bites, except for lower teeth 60, 61 during balancing bite. A few points of contact are common to two different bites, and thus two different tubes 28 are connected to the contacts 27 mounted in such points of contact.

The contacts 27, shown in FIG. 2, are assigned arbitrary and consecutive individual reference numbers. Table III lists along the top of the table the "first contact reference number." This "first contact" is connected to the grid of a thyratron tube through a grid current limiting resistor 144. Table III gives the upper tooth in which the first contact is mounted, the location of the first contact on the aforesaid tooth, and a second contact reference number. Where the circuit in articulator 10 is closed by contact between a lower tooth 20 and two contacts 27, the "second contact" listed in Table III is the other contact in said circuit, and is connected to common plate lead 85 (see FIG. 6). Where the circuit in articulator 10 is closed by contact between one contact 27 and a lower tooth 20, a dash appears in the "second contact" row in Table III. Table III gives the upper tooth in which the second contact is mounted and the location of the second contact on said tooth. Table III also lists the lower conducting tooth that completes the circuit with the above mentioned contact or contacts, the particular bite relationship in which the contacts and the lower tooth are engaged in, and the corresponding thyratron tube which indicates preferred occlusion when the above mentioned lower conducting tooth makes electrical contact with the above mentioned first and second contacts or first contact (where there is no second contact) in the aforesaid bite relationship.

TABLE III.—FIRST CONTACT REFERENCE NUMBER

| | 111 | 113 | 113 | 131 | 133 | 133 | 110 |
|---|---|---|---|---|---|---|---|
| Upper tooth in which first contact is mounted. | 400 | 300 | 300 | 410 | 310 | 310 | 400. |
| Location of 1st contact on tooth | Lingual cusp | Tip of cusp | Tip of cusp | Lingual cusp | Tip of cusp | Tip of cusp | Marginal Ridge. |
| 2d contact reference No | 112 | 114 | | 132 | 134 | | 109. |
| Upper tooth in which 2d contact is mounted. | 400 | 400 | | 410 | 410 | | 500. |
| Location of 2d contact on tooth | Marginal ridge. | Buccal cusp | | Marginal ridge. | Buccal cusp | | Marginal ridge. |
| Lower tooth | 40 | 40 | 40 | 41 | 41 | 41 | 50. |
| Bite relationship | Centric | Working | Protrusive | Centric | Working | Protrusive | Centric. |
| Tube | 42 | 44 | 48 | 43 | 45 | 49 | 52. |

| | 115 | 111 | 130 | 135 | 131 | 107 | 117 |
|---|---|---|---|---|---|---|---|
| Upper tooth in which first contact is mounted. | 400 | 400 | 410 | 410 | 410 | 500 | 500. |
| Location of 1st contact on tooth | Buccal cusp | Lingual cusp | Marginal ridge. | Buccal cusp | Lingual cusp | Marginal ridge. | Buccal cusp. |
| 2d contact reference No | 116 | | 129 | 136 | | 105 | 118. |
| Upper tooth in which 2d contact is mounted. | 500 | | 510 | 510 | | 600 | 600. |
| Location of 2d contact on tooth | Buccal cusp | | Marginal ridge. | Buccal cusp | | Central fossa | Buccal cusp. |
| Lower tooth | 50 | 50 | 51 | 51 | 51 | 60 | 60. |
| Bite relationship | Working | Balancing | Centric | Working | Balancing | Centric | Working. |
| Tube | 54 | 56 | 53 | 55 | 57 | 62 | 64. |

| | 108 | 127 | 137 | 128 | 104 | 119 |
|---|---|---|---|---|---|---|
| Upper tooth in which first contact is mounted. | 500 | 510 | 510 | 510 | 700 | 700. |
| Location of 1st contact on tooth | Lingual cusp | Marginal ridge. | Buccal cusp | Lingual cusp | Marginal ridge. | Buccal cusp. |
| 2d contact reference No | 106 | 125 | 138 | 126 | 102 | 101. |
| Upper tooth in which 2d contact is mounted. | 600 | 610 | 610 | 610 | 700 | 700. |
| Location of 2d contact on tooth | Lingual cusp | Central fossa | Buccal cusp | Lingual cusp | Marginal ridge. | Buccal cusp. |
| Lower tooth | 60 | 61 | 61 | 61 | 70 | 70. |
| Bite relationship | Balancing | Centric | Working | Balancing | Centric | Working. |
| Tube | 66 | 63 | 65 | 67 | 72 | 74. |

| | 103 | 103 | 124 | 139 | 123 | 123 |
|---|---|---|---|---|---|---|
| Upper tooth in which first contact is mounted. | 700 | 700 | 710 | 710 | 710 | 710. |
| Location of 1st contact on tooth | Lingual cusp | Lingual cusp | Marginal ridge. | Buccal cusp | Lingual cusp | Lingual cusp. |
| 2d contact reference No | | | 122 | 121 | | |
| Upper tooth in which 2d contact is mounted. | | | 710 | 710 | | |
| Location of 2d contact on tooth | | | Marginal ridge | Buccal cusp | | |
| Lower tooth | 70 | 70 | 71 | 71 | 71 | 71. |
| Bite relationship | Balancing | Protrusive | Centric | Working | Balancing | Protrusive. |
| Tube | 76 | 78 | 73 | 75 | 77 | 79. |

Table III states that "first contact" 111 is located on the lingual cusp of upper tooth 400 (upper left first bicuspid) and that "second contact" 112 is located on the marginal ridge of upper tooth 400. Table III indicates that when correct occlusion in the centric bite relationship occurs, lower electrically conducting tooth 40 makes electrical contact with contacts 111 and 112. Referring to FIG. 2, which shows certain lower teeth, indicating therein in dotted lines, superimposed on the model teeth of the upper jaw in the centric bite relationship, it is seen that contacts 111 and 112 are located on tooth 400 and that lower tooth 40 makes contact with the aforesaid contacts. According to Table III, when lower conducting tooth 40 makes electrical contact with contacts 111 and 112, thyratron tube 42 glows.

FIG. 8 shows the eight electrical conducting lower teeth and how they are connected to the common plate lead 85. Common plate lead 85 appears at the bottom of FIG. 8 and is connected with the leads numbered 85 in FIG. 6. Lower teeth 40, 41, 70, 71 are joined to lead 85 by poles 145 of a four pole single throw switch. Similarly, lower teeth 50, 51, 70, 71 are joined to lead 85 by poles 146 of a four pole single throw switch. Poles 145, 146 for lower tooth 70 are wired in parallel, as are poles 145, 146 for lower tooth 71. For convenience of operation, switches 145, 146 are mechanically linked with switches 98, 142, respectively (see FIG. 6).

Thus, when switch 98 is closed in preparing to check occlusion in the protrusive bite, switch 145 is also closed, preparing lower teeth 40, 41, 70, 71 to complete the circuits necessary to cause tubes 48, 49, 78, 79 to glow if proper protrusive occlusion exists. The mechanical link between switches 142, 146 performs the same function in checking occlusion in the balancing bite relationship.

Figure 4:
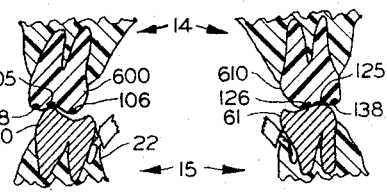
FIG. 4 is a view similar to FIG. 3, in which the same sets of teeth are shown in centric bite position.

FIGS. 1, 2 and 4 show the relation between upper and lower jaws 14, 15 during centric bite. FIG. 4 illustrates contact between two of contacts 27 and lower teeth 20 during preferred occlusion in the centric bits relationship. Lower tooth 60 touches contact 105 located in upper tooth 600, but does not touch contacts 106, 118 which are used in checking balancing and working bites, respectively (Table III). Similarly, tooth 60 touches contact 107, located in upper tooth 500, but not contacts 108, 117 (FIG. 2). Thus, lower tooth 60 connects contacts 105, 107 during centric bite with proper occlusion, and does not touch contacts 106, 108, 117, 118. Lower tooth 61 connects contacts 125, 127 during centric bite with proper occlusion, and does not touch contacts 126, 128, 137, 138.

After a student has set lower teeth 20 in articulator 10, he closes the articulator in a manner simulating one of the aforementioned bite relations. If centric bite has been chosen, and tooth 60 has been set in a position to given proper occlusion, said tooth will touch contacts 105, 107, as explained above. Thus, when contact 105 is electrically connected to lead 85 and contact 107 is electrically connected to current limiting resistor 144, and when lower tooth 60 touches contacts 105, 107, grid 81 of tube 62 is connected through a current limiting resistor 144 to common plate lead 85 since lower tooth 60 (made of metal having good electrical conductivity) completes the circuit. As has been explained previously, application of the voltage of power supply 83 to grid 81 and cathode 80 is sufficient to cause breakdown and gaseous discharge or glow conduction between plate 83 and cathode 80 within tube 62. Thus, the existence of preferred occlusion for tooth 60 in centric bite is visually indicated. When articulator 10 is later opened, tube 62 will continue to conduct, retaining the information which the student needs while he makes a new trial setting.

Tube 62 will continue to glow until the flow of current between cathode 80 and plate 82 is broken. Clear button 87 is provided for the purpose of conveniently interrupting such current flow. After clear button 87 is pushed, interrupting the flow of current through tube 62, the tube stops glowing because the voltage between cathode 80 and plate 82 is not sufficient to initiate the flow of current. Of course, current through tube 62 can also be interrupted by momentarily opening switch 96, but ordinarily push button 87 is more convenient to use. After resetting lower teeth 20 and pushing clear button 87, the student may again close articulator 10 to ascertain whether or not his latest trial setting has given better results.

Referring to FIG. 2 and Table III, it is noted that when proper occlusion occurs in the centric bite relationship, lower tooth 41 makes electrical contact with contacts 131 and 132 of upper tooth 410; that lower tooth 50 makes electrical contact with contacts 110 and 109 of upper teeth 400 and 500, respectively; that lower tooth 51 makes electrical contact with contacts 130 and 129 of upper teeth 410 and 510, respectively; that lower tooth 61 makes electrical contact with contacts 127 and 125 of upper teeth 510 and 610, respectively; that lower tooth 70 makes electrical contact with contacts 104 and 102 of upper tooth 700, and; that lower tooth 71 makes electrical contact with contacts 124 and 122 of upper tooth 710.

Figure 5:
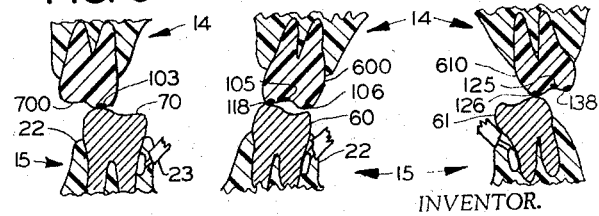
FIG. 5 is a cross-sectional view of the same sets of teeth as in FIG. 3, in which the left teeth are shown in working bite relation and the right teeth are shown in balancing bite relation.

The positions of the jaws 14, 15 shown in FIGS. 3, 5 produce working bite relation on one side of the jaws, and balancing bite relation on the other. In FIG. 3, teeth 60, 600 are in balancing bite relation, and teeth 61, 610 are in working bite relation. In FIG. 5, teeth 60, 600 are in working bite relation, and teeth 61, 610 are in balancing bite relation.

In FIGS. 3 and 5, teeth 60, 61 are shown in proper occlusion with teeth 600, 610. In the manner previously explained, contacts 106, 108 touch lower tooth 60, and cause tube 66 to indicate proper balancing occlusion for tooth 60 (FIGS. 2, 3). Similarly, contacts 126, 128 in upper teeth 610 and 510, respectively, touch lower tooth 61 and cause tube 67 to indicate preferred occlusion for tooth 61 in balancing bite relation (FIGS. 2, 5). In working bite relation, contacts 137, 138 touch lower tooth 61 and cause tube 65 to indicate proper occlusion for tooth 61 in working bite (FIGS. 2, 3). Similarly, contacts 117, 118 touch lower tooth 60 during proper occlusion in working bite and cause tube 64 to indicate proper occlusion for tooth 60 in working bite (FIGS. 2, 5).

Figure 9:
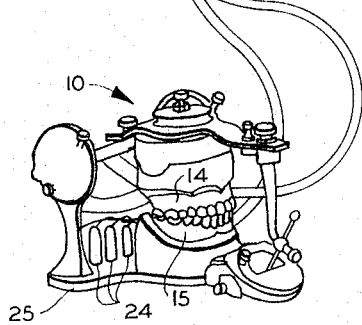
FIG. 9 is a cross-sectional view of the left side of the upper and lower jaws of the articulator taken generally along line 9—9 of FIG. 2, in which the teeth are shown in balancing bite position.

FIG. 9 illustrates the manner in which a tube 28 is ignited where only one contact 27 touches a lower tooth 20. FIG. 9 shows teeth 70, 700 in balancing bite relation. Contact 103 touches lower tooth 70 during preferred occlusion. If switches 146 are closed, lower tooth 70 is connected to common plate lead 85. Thus, when when tooth 70 touches contact 103, a sufficient voltage is applied to grid 81 of tube 76 to cause said tube to ignite.

Referring to FIG. 2 and Table III, it is noted that when proper occlusion occurs in the working bite relationship, that lower tooth 40 makes electrical contact with contacts 113 and 114 of upper teeth 300 and 400, respectively; that lower tooth 41 makes electrical contact with contacts 133 and 134 of upper teeth 310 and 410, respectively; that lower tooth 50 makes electrical contact with contacts 115 and 116 of upper teeth 400 and 500, respectively; that lower tooth 51 makes electrical contact with contacts 135 and 136 of upper teeth 410 and 510, respectively; that lower tooth 70 makes electrical contact with contacts 119 and 101 of upper tooth 700, and; that lower tooth 71 makes electrical contact with contacts 139 and 121 of upper tooth 710.

It is also noted that when proper occlusion occurs in the balancing bite relationship, that lower tooth 50 makes electrical contact with contact 111 of upper tooth 400; that lower tooth 51 makes electrical contact with contact 131 of upper tooth 410, and; that lower tooth 71 makes electrical contact with contact 123 of upper tooth 710.

Finally, it is seen that when proper occlusion occurs in the protrusive bite relationship, that lower tooth 40 makes electrical contact with contact 113 of upper tooth 300; that lower tooth 41 makes electrical contact with contact 133 of upper tooth 310; that lower tooth 70 makes electrical contact with contact 103 of upper tooth 700, and; that lower tooth 71 makes electrical contact with contact 123 of upper tooth 710.

Indicating unit 11 (FIG. 1) has, in addition to the switches already identified, a power-on switch 147 and a measuring mode switch 148. Switch 147 controls power supply 83 in a conventional manner, depending, of course, upon the type of supply used. Indicator lamp 149 indicates when supply 83 is turned on.

A milliammeter 150 is used in connection with measuring resistors 86, 95, 97, 99, 140, 141 to indicate the proportion or percentage of tubes 28 within various significant groups of said tubes that are glowing and thus indicating proper occlusion. The circuit connecting meter 150 with the aforementioned measuring resistor is shown in FIG. 7.

Meter 150 is connected between the two poles of double pole six position switch 148. Each measuring resistor is connected between a contact of the first pole and a contact of the second pole of switch 148 (enumerated in Table IV).

TABLE IV.—CONNECTIONS BETWEEN MEASURING RESISTORS AND SWITCH 148

| Measuring Resistor | Switch Position Measuring— | First Pole Contact | Second Pole Contact |
| --- | --- | --- | --- |
| 95 | Centric | 151 | 152 |
| 99 | Working | 153 | 154 |
| 141 | Balancing | 155 | 156 |
| 97 | Protrusive | 157 | 158 |
| 140 | Cross Mouth | 159 | 160 |
| 86 | Total | 161 | 162 |

The terminals of the contacts listed in Table IV are shown in both FIGS. 6 and 7 to illustrate the connections between switch 148 and the measuring resistors listed in Table IV.

As the tubes 28, which are connected to a particular common cathode lead 90–93 in parallel, are ignited, the amount of current flowing through the measuring resistor increases, and thus the voltage across it increases. By proper selection of the values of resistance of the particular measuring resistor and the resistors 163 connected in series with meter 150, the meter can be caused to read full scale when all the tubes 28 that can draw current through said particular measuring resistor are conducting. Then, when a lesser number of said tubes 28 are glowing and drawing current, the circuitry accompanying meter 150 will total the number of tubes that are conducting and thus indicate the degree of preferred occlusion within the group of said tubes 28 which are connected to said particular common cathode lead.

As an illustrative example, tubes 42, 43, 52, 53, 62, 63, 72, 73 all draw cathode current through measuring resistor 95, and constitute the group of tubes 28 that indicate centric occlusion.

The value of resistance selected for measuring resistor 95 should be very small in comparison to resistors 84. Resistors 84 should be all of the same value so that the same value of current will pass through each of tubes 28. Thus, when only some of said tubes are glowing and drawing current, the meter reading will be proportional to the number of tubes lit. For example, for one tube, meter 150 will read ⅛ full scale or 12.5%, for two tubes, ¼ full scale or 25%, three tubes, ⅜ full scale or 37.5%, and so forth to ⅞ full scale or 87.5% for seven tubes and full scale or 100% for all eight. The same principles apply to operation of the meter when switch 148 is in its second, third or fourth positions, for registering the degree of working, balancing or protrusive occlusion, respectively.

Cross-mouth occlusion denotes a balancing bite relationship for one side of the jaw simultaneously with a working bite relationship for the other side of the jaw. To check cross-mouth occlusion, clear button 87 is used while articulator 10 is open, then articulator 10 is closed in one or the other of the positions shown in FIGS. 3, 5. If perfect cross-mouth occlusion exists, four working bite tubes 28 for one side of jaw 15 and three balancing bite tubes 28 for the other side of jaw 15 will glow. By placing switch 148 in its fifth position (i.e., when the poles are at contacts 159 and 160), meter 150 will show the proportion of preferred cross-mouth occlusion in the same manner as that described above for centric occlusion.

After occlusion has been checked for all the various bite relationships, switch 148 is placed in its sixth position (i.e., when the poles are at contacts 161 and 162). In this position switch 148 places meter 150 across measuring resistor 86 through which all current to the plates of all tubes 28 must pass. Accordingly, in the sixth position of switch 148, meter 150 will indicate the percentage or proportion of all tubes 28 that have been ignited.

While certain apparatus embodying this invention has been described in detail, it will be apparent that the invention is capable of variation and modification from the form shown, and in particular that other conventional indicating units may be substituted for the one herein described, and therefore it is to be understood that the scope of this invention should be limited only by the scope of the claims appended hereto.

I claim:
1. Dental occlusion teaching apparatus, comprising:
 (a) at least one pair of tooth models;
 (b) means simulating jaw movement and mounting the tooth models of said pair for opposed movement into and out of a predetermined bit relationship;
 (c) said mounting means including an adjustable mounting for one of the tooth models of said pair;
 (d) electrical contact means on said tooth models positioned for engagement when said one tooth model is in correct occlusion with the other tooth model of said pair; and
 (e) a circuit connecting said contact means and including indicating means indicating such engagement of said contact means.
2. The apparatus of claim 1 in which:
 (f) said indicating means includes means retaining the indication of such engagement after movement of said tooth models out of said bite relationship.
3. The apparatus of claim 2, including:
 (g) means for interrupting said indication retaining means.
4. A device for teaching dental occlusion, comprising:
 (a) upper and lower dental arches simulative of human jaws;
 (b) means mounting said dental arches in opposed relation and for relative movement simulating human jaw movement;
 (c) upper and lower sets of model teeth respectively supported in said arches for movement therewith into predetermined bite relationships;
 (d) one of said arches including adjustable mounting means permitting orientation of the model teeth of one set thereof into preferred occlusion with the other set at each of said bite relationships;
 (e) contact means positioned at selected locations on said model teeth for engagement only upon said model teeth being oriented in said preferred occlusion; and
 (f) indicating means indicating said engagement.
5. The device of claim 4, in which:
 (g) one set of said teeth models being formed of non-conducting material and provided with a plurality of individual, electrically conducting contacts at some of the tips of cusps, marginal ridges, central fossae, lingual cusp and buccal cusp thereof;
 (h) the other of said set of teeth models having their entire engaging surfaces formed of electrically conducting material; and
 (i) said indicating means including a plurality of electrical circuits each completed by engagement of some of said contacts with some of said surfaces.
6. The device of claim 5, including:
 (j) means totaling the number of said circuits completed.

References Cited by the Examiner
UNITED STATES PATENTS

| | | | |
|---|---|---|---|
| 1,581,736 | 4/1926 | Hassler | 35—17 |
| 2,095,511 | 10/1937 | Oberto | 32—71 |
| 3,239,935 | 3/1966 | Shackelford | 32—19 |

RICHARD A. GAUDET, *Primary Examiner.*

J. W. HINEY, JR., *Assistant Examiner.*